United States Patent
Jovicic et al.

(10) Patent No.: US 11,280,517 B1
(45) Date of Patent: Mar. 22, 2022

(54) AIR VENT WITH ROTATING CONTROL ELEMENTS AND A CENTRAL ELEMENT DEFINING CHANNELS AND METHOD OF CONTROLLOING AIR FLOW VIA SAME

(71) Applicant: Ultra Manufacturing Limited, Kitchener (CA)

(72) Inventors: Nikola Jovicic, Kitchener (CA); Jason Fraser, Kitchener (CA); Marian Ticu, Kitchener (CA)

(73) Assignee: Ultra Manufacturing Limited, Kitchener (CA)

( * ) Notice: Subject to any disclaimer, the term of this patent is extended or adjusted under 35 U.S.C. 154(b) by 0 days.

(21) Appl. No.: 17/032,881

(22) Filed: Sep. 25, 2020

(51) Int. Cl.
  *B60H 1/34* (2006.01)
  *F24F 13/14* (2006.01)
  *F24F 13/15* (2006.01)

(52) U.S. Cl.
  CPC ....... *F24F 13/1426* (2013.01); *B60H 1/3414* (2013.01); *F24F 13/15* (2013.01); *B60H 2001/3471* (2013.01)

(58) Field of Classification Search
  CPC ........... B60H 1/3414; B60H 2001/3471; F24F 13/1426; F24F 13/15
  See application file for complete search history.

(56) References Cited

U.S. PATENT DOCUMENTS

| | | | |
|---|---|---|---|
| 8,662,970 B2 | 3/2014 | Nagasaka et al. | |
| 9,163,848 B2 | 10/2015 | Doll et al. | |
| 9,513,027 B2 | 12/2016 | Londiche et al. | |
| 9,963,015 B1 | 5/2018 | Fraser et al. | |
| 10,408,490 B2 | 9/2019 | Londiche et al. | |
| 10,464,397 B2 | 11/2019 | Castiglioni et al. | |
| 2004/0203334 A1* | 10/2004 | Shibata | B60H 1/3428 454/155 |
| 2015/0065031 A1* | 3/2015 | Shibata | B60H 1/3421 454/322 |
| 2017/0057325 A1* | 3/2017 | Brinas | B60H 1/3421 |
| 2017/0190242 A1* | 7/2017 | Doll | B60H 1/3428 |
| 2018/0056756 A1* | 3/2018 | Schaal | B60H 1/3414 |
| 2019/0092137 A1* | 3/2019 | Lee | B60H 1/3421 |
| 2019/0270363 A1 | 9/2019 | Hoerschler et al. | |
| 2019/0359034 A1* | 11/2019 | Dinant | B60H 1/3428 |
| 2020/0009944 A1* | 1/2020 | Wilhelmsson | B60H 1/3421 |

(Continued)

FOREIGN PATENT DOCUMENTS

| | | | | |
|---|---|---|---|---|
| DE | 102016116356 A1 * | 3/2018 | .......... | B60H 1/3421 |
| DE | 102019115285 A1 * | 4/2020 | .......... | B60H 1/3414 |

(Continued)

*Primary Examiner* — Vivek K Shirsat
*Assistant Examiner* — Ko-Wei Lin

(57) ABSTRACT

A ventilation system including a housing, with an inlet end into which air is directed, and an outlet end at which the air exits. The housing includes an inlet portion at the inlet end, and first and second channels downstream from the inlet portion. The ventilation system includes an air flow guide element pivotable between a first position, in which a first major portion of the air flowing into the inlet end is directed into the first channel and a first minor portion of the air flow is directed into the second channel, and a second position, in which a second major portion of the air flowing into the inlet end is directed into the second channel and a second minor portion of the air flow is directed into the first channel.

13 Claims, 15 Drawing Sheets

(56) References Cited

U.S. PATENT DOCUMENTS

2020/0254850 A1* 8/2020 Doll .................... B60H 1/3414
2021/0094392 A1   4/2021 Munoz et al.

FOREIGN PATENT DOCUMENTS

| DE | 102019105409 A1 | * | 9/2020  | ........... B60H 1/3414 |
|----|-----------------|---|---------|------------------------|
| EP | 3231647 A1      | * | 10/2017 | ............ B60H 1/345 |
| EP | 3632726 A1      | * | 4/2020  | ........... B60H 1/3414 |
| EP | 3702185 A1      | * | 9/2020  | ........... B60H 1/3414 |
| JP | 2013180708 A    | * | 9/2013  |                        |

\* cited by examiner

AIR VENT WITH ROTATING CONTROL ELEMENTS AND A CENTRAL ELEMENT DEFINING CHANNELS AND METHOD OF CONTROLLOING AIR FLOW VIA SAME

FIELD OF THE INVENTION

The present invention is a ventilation system and a method for directing air into an enclosed space.

BACKGROUND OF THE INVENTION

There are many known arrangements for directing a flow of air, whether heated or cooled, into enclosed spaces, such as passenger compartments in vehicles. The prior art air vent receives the air directed into it at one or more inlets, and the air exits the air vent at one or more outlets. Typically, the prior art arrangements often include vanes for guiding the air exiting the air vent over a range of positions that are generally transverse relative to the vertical.

The known air vents have various disadvantages. For example, the vanes are often located at the one or more outlets, and this may be undesirable, e.g., because the vanes are unsightly in the context of the interior panels of the passenger compartment, or because dust and dirt may collect at the vanes.

Air vents are typically designed to provide an appearance, at the outlets, that is appealing, and consistent with the other features of the interior of the automobile. However, air vents that meet aesthetic criteria often are not functionally optimal.

SUMMARY OF THE INVENTION

For the foregoing reasons, there is a need for a ventilation system and method that overcomes or mitigates one or more of the disadvantages or defects of the prior art.

In its broad aspect, the invention provides a ventilation system including a housing that extends between an inlet end, into which a volume of air is directed in an initial air flow direction, and an outlet end, at which the volume of air exits the housing. The housing includes a central element, a first outer element, and a second outer element. The central element has first and second central element surfaces. The first outer element has a first internal surface spaced apart from the first central element surface, to define a first channel therebetween. Also, the second outer element has a second internal surface spaced apart from the first central element surface, to define a second channel therebetween. The housing also includes an inlet portion located between the inlet end and the first and second channels. The inlet portion includes an inlet channel defined by one or more inlet portion walls.

The ventilation system also includes an air flow guide element extending between a base portion and a tip thereof. The air flow guide element is movable between first and second positions thereof.

When the air flow guide element is in its first position, the tip is located at a predetermined first minimum distance from the inlet portion wall. In addition, when the air flow guide element is in the first position, the air flow guide element directs a first major portion of the volume of air flowing into the inlet end into the first channel.

When the air flow guide element is in its second position, the tip is located at a predetermined second minimum distance from the inlet portion wall. In addition, when the air flow guide element is in the second position, the air flow guide element directs a second major portion of the volume of air flowing into the inlet end into the second channel.

Because the tip is spaced apart from the inlet portion wall by the first minimum distance when the air flow guide element is in its first position, a first minor portion of the volume of air flowing into the inlet end is allowed to flow between the tip and the inlet portion wall, into the second channel. Similarly, when the air flow guide element is in its second position, a second minor portion of the volume of air flowing into the inlet end is allowed to flow between the tip and the inlet portion wall, into the first channel.

BRIEF DESCRIPTION OF THE DRAWINGS

The invention will be better understood with reference to the attached drawings, in which.

DETAILED DESCRIPTION

Figure 1:
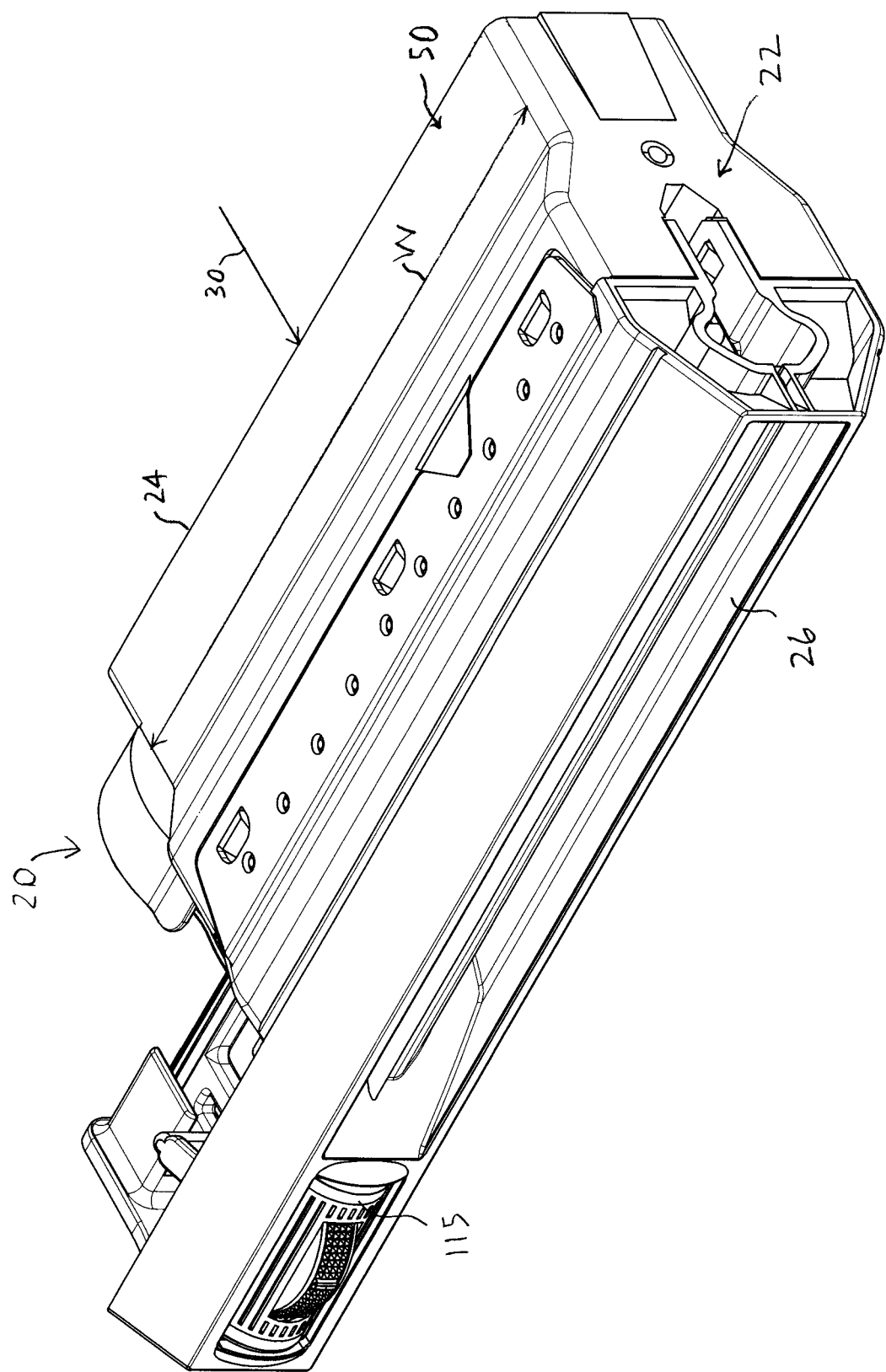
FIG. 1 is an isometric view of a front side and a top side of an embodiment of a ventilation system of the invention.

In the attached drawings, like reference numerals designate corresponding elements throughout. Reference is made to FIGS. 1-5C to describe an embodiment of a ventilation system in accordance with the invention indicated generally by the numeral 20. In one embodiment, the ventilation system 20 preferably includes a housing 22 extending between an inlet end 24, into which a volume of air is directed in an initial air flow direction, and an outlet end 26, at which the volume of air exits the housing 22 (FIG. 1). As will be described, the inlet end 24 and the outlet end 26 define a central plane 28 of the housing 22 (FIG. 3B).

Figure 3A:
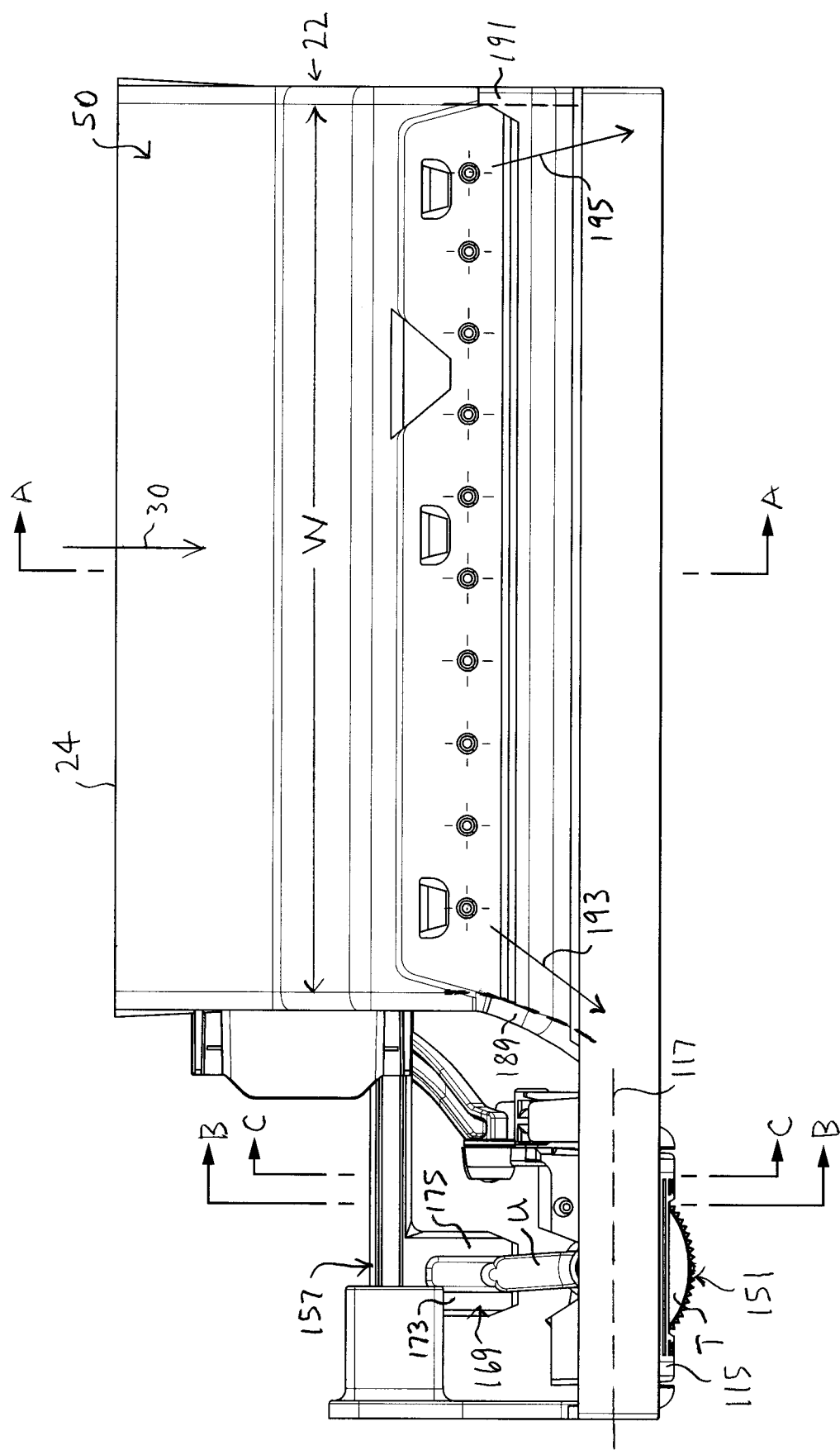
FIG. 3A is a top view of the ventilation system of FIGS. 1-2B.
Figure 3B:
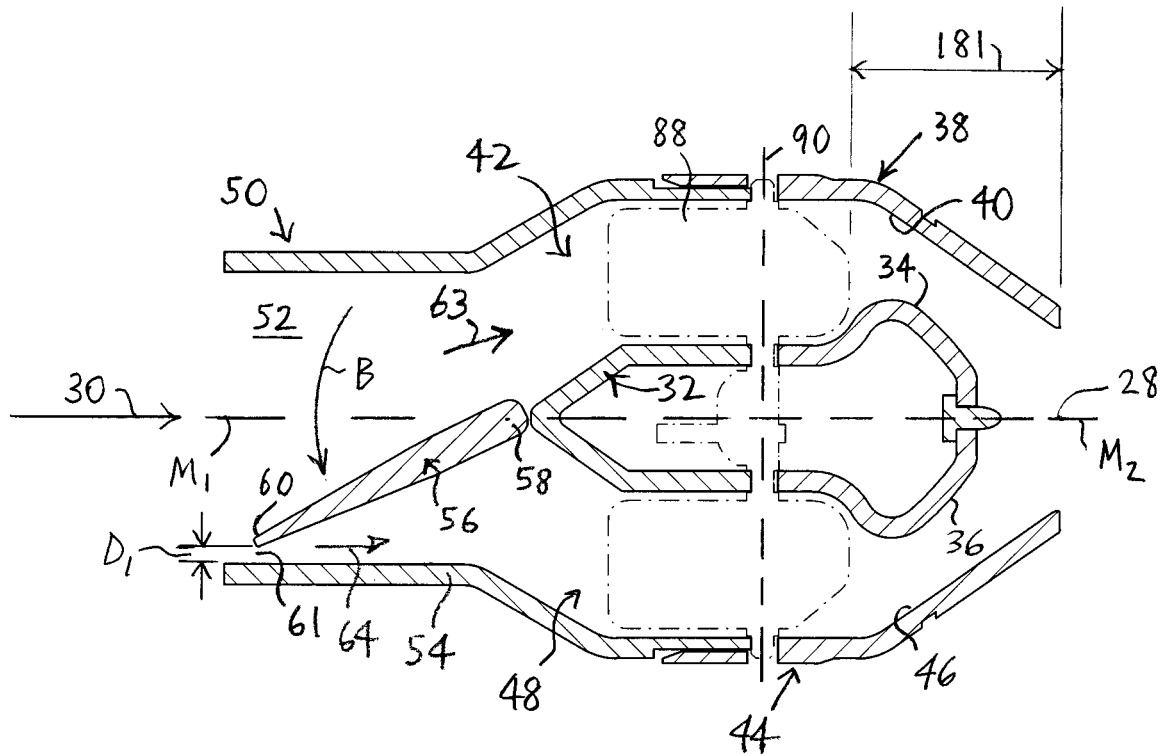
FIG. 3B is a cross-section of the ventilation system of FIG. 3A taken along section A-A in FIG. 3A, in which an air flow guide element is in a first position thereof, drawn at a larger scale.
Figure 3C:
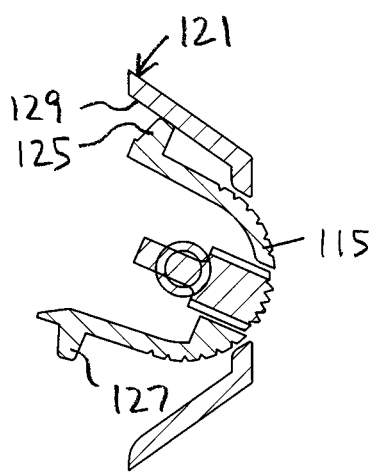
FIG. 3C is a cross-section taken along section B-B in FIG. 3A, in which a first control element body including a stop element is in a first position thereof, corresponding to the first position of the air flow guide element in FIG. 3B.
Figure 3D:
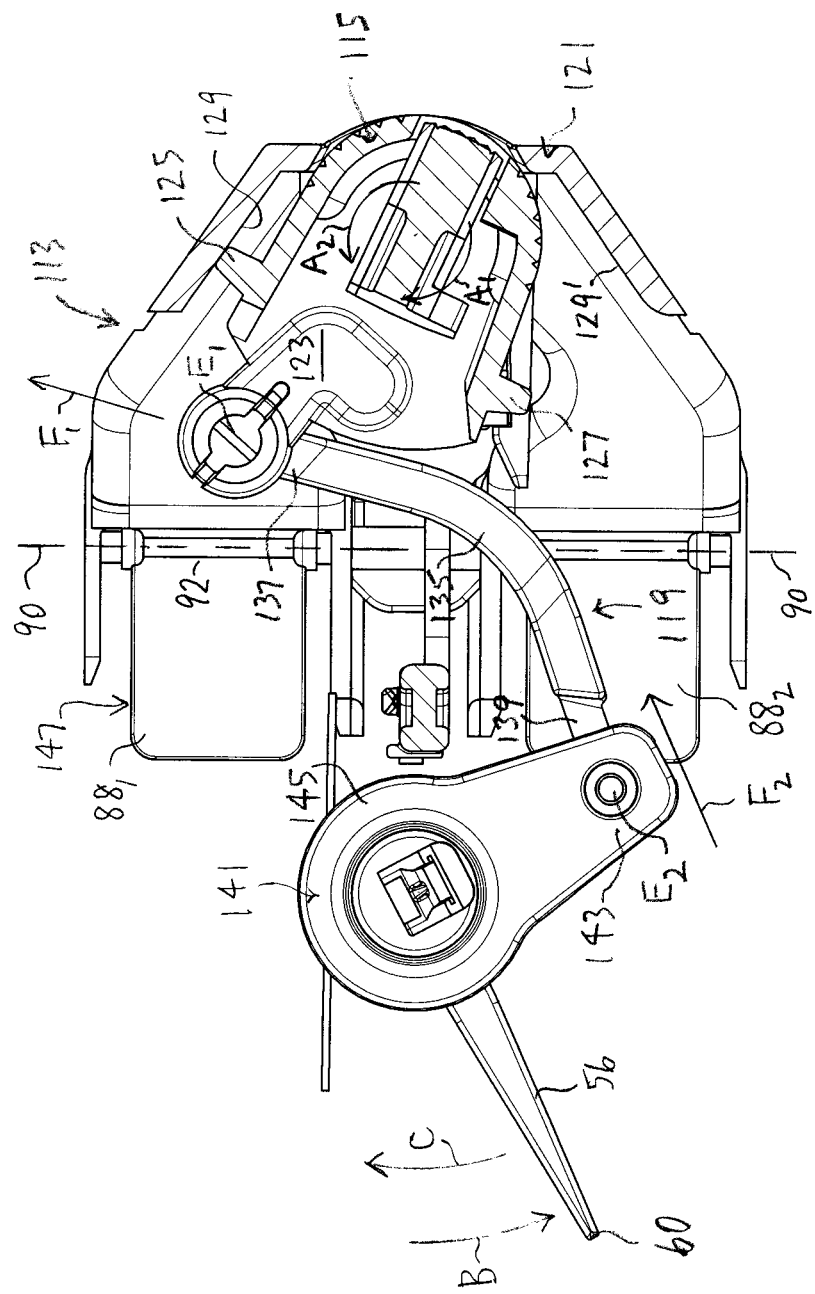
FIG. 3D is a cross-section taken along section C-C in FIG. 3A, showing a first linkage assembly connecting the first control element body and the air flow guide element when the stop element is in the first position thereof, drawn at a larger scale.
Figure 3E:
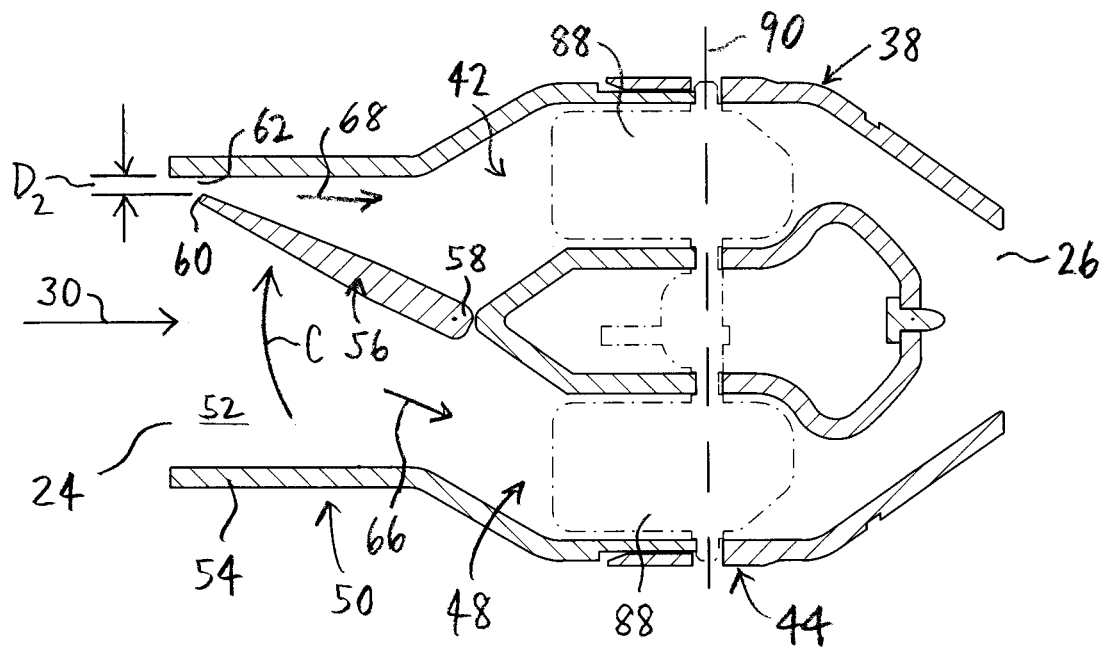
FIG. 3E is a cross-section of the ventilation system of FIG. 3A taken along section A-A in FIG. 3A, in which the air flow guide element is in a second position thereof, drawn at a smaller scale.
Figure 3F:
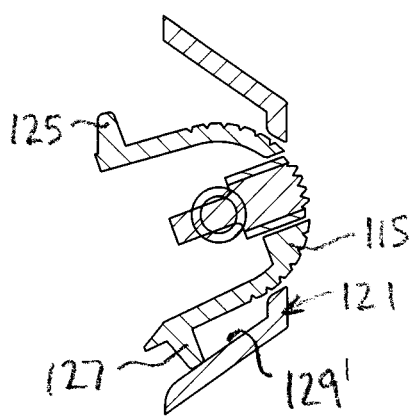
FIG. 3F is a cross-section taken along section B-B in FIG. 3A, in which the first control element body including the stop element is in a second position thereof, corresponding to the second position of the air flow guide element in FIG. 3E.
Figure 3G:
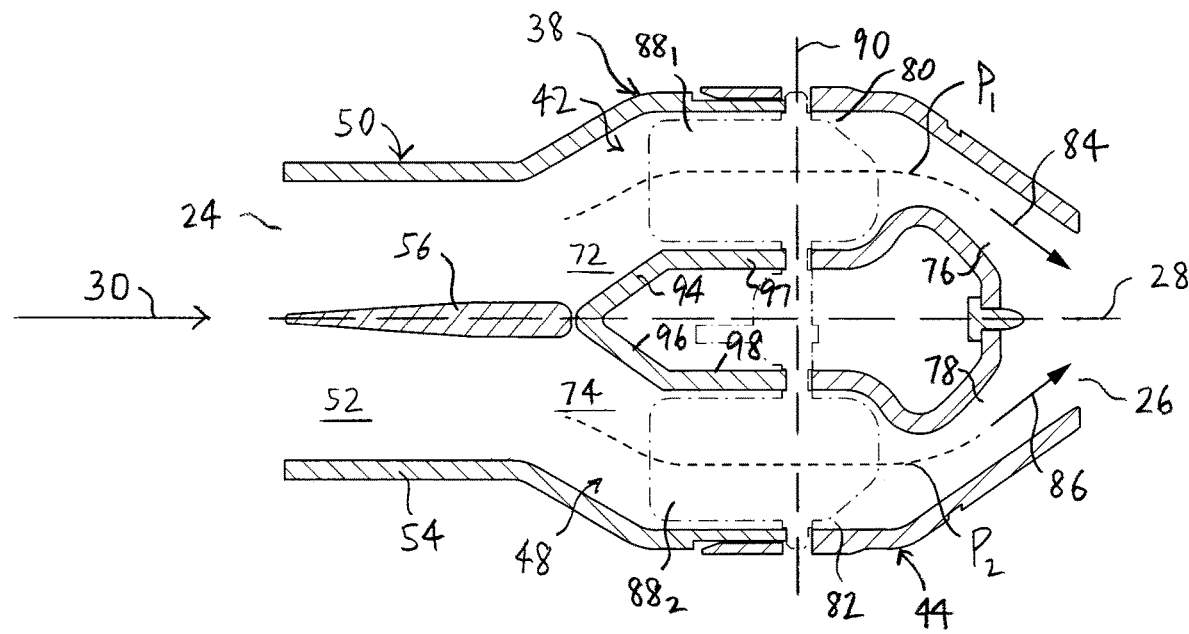
FIG. 3G is a cross-section of the ventilation system of FIG. 3A taken along section A-A in FIG. 3A, in which the air flow guide element is in a middle position thereof, equidistant between the first and second positions thereof.

In FIGS. 3A, 3E, and 3G, the initial air flow direction of the volume of air into the inlet end 24 is schematically indicated by arrow 30.

The central plane 28 is defined by the midpoints "$M_1$", "$M_2$" of the inlet end 24 and the outlet end 26 (FIG. 3B).

Preferably, the housing 22 includes a central element 32 that includes first and second central element surfaces 34, 36 (FIGS. 3B, 3E, 3G). It is also preferred that the housing 22 includes a first outer element 38 having a first internal surface 40 that is spaced apart from the first central element surface 34, to define a first channel 42 therebetween. The housing 22 preferably also includes a second outer element 44 having a second internal surface 46 that is spaced apart from the second central element surface 36, to define a second channel 48 therebetween.

As can be seen, e.g., in FIGS. 3B, 3E, and 3G, the housing 22 preferably also includes an inlet portion 50 that is located between the inlet end 24 and the first and second channels 42, 48. The inlet portion 50 includes an inlet channel 52 therein that is defined by one or more inlet portion walls 54. The volume of air is directed into the inlet portion 50 in the initial air flow direction, indicated by arrow 30.

The ventilation system 20 preferably also includes an air flow guide element 56 that extends between a base portion 58 and a tip 60 thereof (FIGS. 3B, 3E, 3G). As will also be described, the air flow guide element 56 is movable between a first position (FIG. 3B), in which the tip 60 is located at a predetermined first minimum distance "$D_1$" from the inlet portion wall 54, and a second position (FIG. 3E), in which the tip 60 of the air flow guide element 56 is located at a predetermined second minimum distance "$D_2$" from the inlet portion wall 54. When the air flow guide element 56 is in its first position, it directs a first major portion of the volume of air flowing into the inlet end 24 in the initial air flow direction into the first channel 42. When the air flow guide element 56 is in its second position, it directs a second major portion of the volume of air flowing into the inlet end 24 in the initial air flow direction into the second channel 48.

Figure 2A:
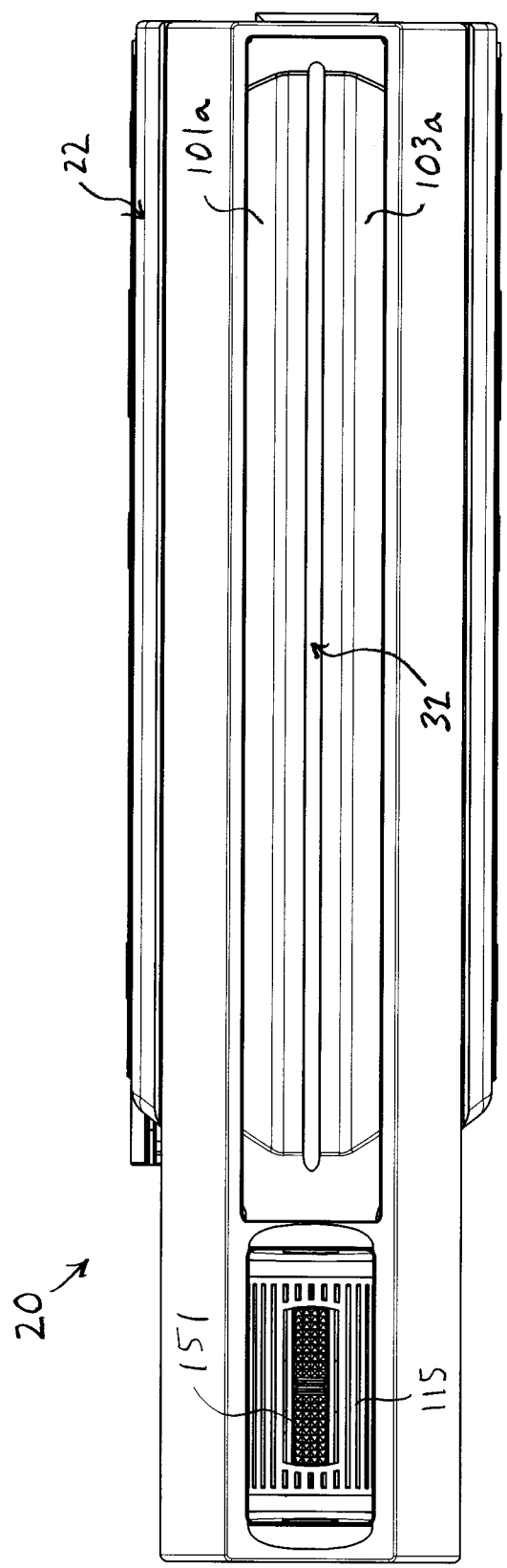
FIG. 2A is an elevation view of a front side of the ventilation system of FIG. 1.
Figure 2B:
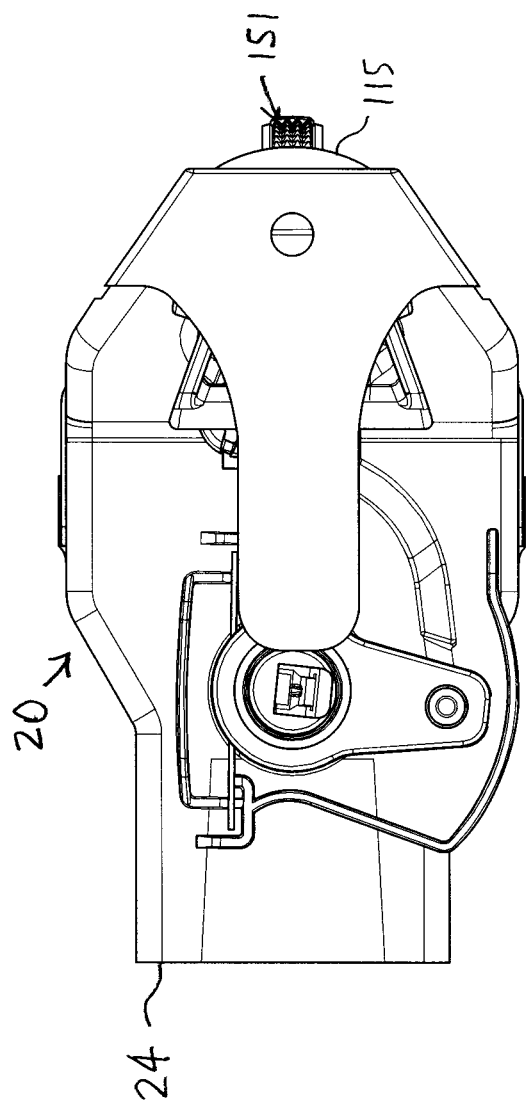
FIG. 2B is a side view of the ventilation system of FIGS. 1 and 2A.

As can be seen in FIGS. 1 and 3A, the housing 22 has a width "W", transverse to the initial air flow direction. The first and second channels 42, 48 preferably extend substantially across the width of the housing. As can be seen in FIGS. 1 and 2A, in one embodiment, the outlet end 26 preferably is greater than the width "W" of the housing 22.

As will be described, the air flow guide element 56 may also be positioned at any intermediate position between the first and second positions. For example, in FIG. 3G, the air flow guide element 56 is shown in a middle position, equidistant between the first and second positions. Those skilled in the art would appreciate that, when the air flow guide element 56 is in its middle position, the air flow guide element 56 effects only a minimal redirection of the volume of air flowing into the inlet portion 50. For the purposes hereof, the middle position is considered to be one of the intermediate positions of the air flow guide element 56.

When the air flow guide element 56 is in the first position, a first gap 61 is defined between the tip 60 and the inlet portion wall 54 (FIG. 3B). When the air flow guide element 56 is in the second position, a second gap 62 is defined between the tip 60 and the inlet portion wall 54 (FIG. 3D). The respective widths of the first and second gaps 61, 62 are the first and second minimum distances "$D_1$", "$D_2$".

As can be seen in FIG. 3B, when the air flow guide element 56 is in the first position, the first major portion of the air flowing into the inlet end 24 (i.e., in the initial air flow direction, indicated by the arrow 30) is directed by the air flow guide element 56 into the first channel 42, but simultaneously a first minor portion of the air is also allowed to flow through the first gap 61, and into the second channel 48. In FIG. 3B, the air flowing into the first channel 42, when the air flow guide element 56 is in the first position, is schematically represented by arrow 63. The air flowing into the second channel 48 when the air flow guide element 56 is in its first position is schematically represented in FIG. 3B by arrow 64.

Similarly, and as can be seen in FIG. 3E, when the air flow guide element 56 is in the second position, the second major portion of the air flowing into the inlet end 24 (i.e., in the direction indicated by the arrow 30) is directed by the air flow guide element 56 into the second channel 48. However, at the same time, a second minor portion of the air is also allowed to flow through the second gap 62, and into the first channel 42. In FIG. 3E, the air flowing into the second channel 48, when the air flow guide element 56 is in the second position, is schematically represented by arrow 66. The air flowing into the first channel 42 when the air flow guide element 56 is in its second position is schematically represented in FIG. 3E by arrow 68.

In one embodiment, and as will be described, it is preferred that the air flow guide element 56 is pivotable about an air flow guide element axis 70 through the base portion 58 of the air flow guide element 56. The air flow guide element axis 70 can be seen, for example, in FIG. 5A.

It will be understood that the air flow guide element 56 may be positioned in the first position, or in the second position, or in any intermediate position between the first and second positions, depending on the preference of a user (not shown). From the foregoing, it can be seen that changing the position of the air flow guide element 56 causes more or less air to flow through the first channel 42 and the second channel 48, as the case may be. It will be understood that, although the first and second channels 42, 48 are illustrated as being in a vertical relationship to each other (i.e., located so as to be upper and lower channels respectively), they may also be positioned in any other relationship to each other.

As will be described, the system 20 preferably is configured to permit the user to adjust the position of the air flow guide element 56 as the user requires. To move the air flow guide element 56 to its first position (and generally away from the second position), the air flow guide element 56 pivots about the axis 70 in the direction indicated by arrow "B" in FIG. 3B. Similarly, to move the air flow guide element 56 to its second position (and generally away from the first position), the air flow guide element 56 pivots about the axis 70 in the direction indicated by arrow "C" in FIG. 3E.

The air directed into the first channel 42, whether it is the first major portion or the first minor portion of the volume of air directed into the inlet portion 50, moves through the first channel 42 in a first channel air flow direction. Similarly, the air directed into the second channel 48, whether it is the second major portion or the second minor portion of the volume of air directed into the inlet portion 50, moves through the second channel 48 in a second channel air flow direction.

As can be seen in FIG. 3G, the first and second channels 42, 48 preferably extend between respective upstream ends thereof 72, 74 and respective downstream ends thereof 76, 78 relative to the first and second air flow directions, respectively. It is preferred that each of the upstream ends 72, 74 and the downstream ends 76, 78 are located proximal to the central plane 28 of the housing 22.

It is also preferred that each of the first and second channels 42, 48 includes a central portion 80, 82 thereof respectively, located between the upstream ends 72, 74 and the downstream ends 76, 78 of the first and second channels 42, 48 (FIG. 3G).

As can also be seen in FIGS. 3B, 3E, and 3G, the central portion 80, 82 of each of the first and second channels 42, 48 preferably is spaced apart from the central plane 28 of the housing 22. As a result, the first and second channels 42, 48 define respective curved paths "$P_1$", "$P_2$" therein along which the first and second channels direct the air respectively flowing therethrough, in the first and second channel air flow directions, at the respective downstream ends 76, 78 (FIG. 3G). In FIGS. 3G and 3I, the first and second channel air flow directions at the respective downstream ends 76, 78 are schematically indicated by arrows 84, 86.

Figure 3I:
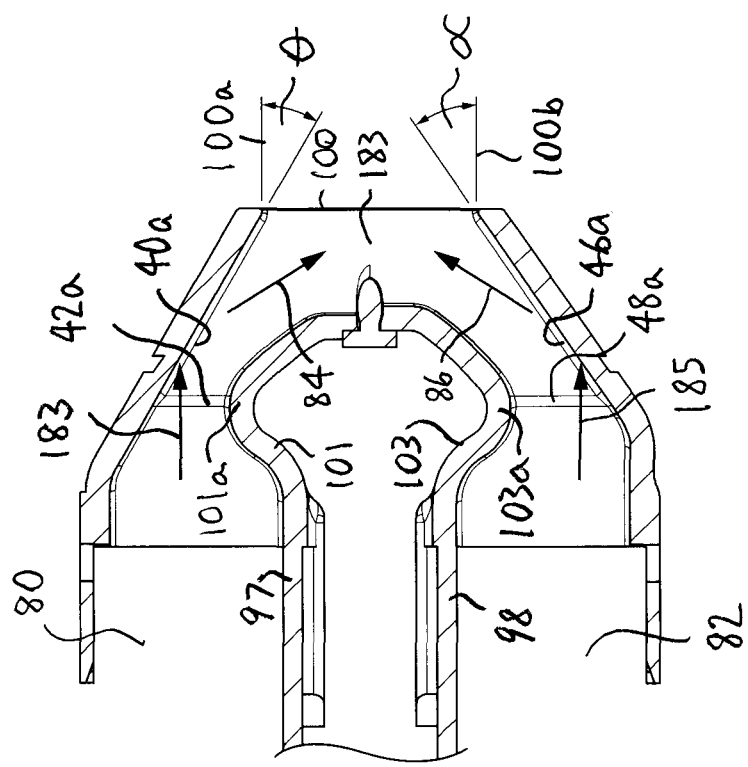
FIG. 3I is a cross-section of the outlet end of the housing, drawn at a larger scale.
Figure 4A:
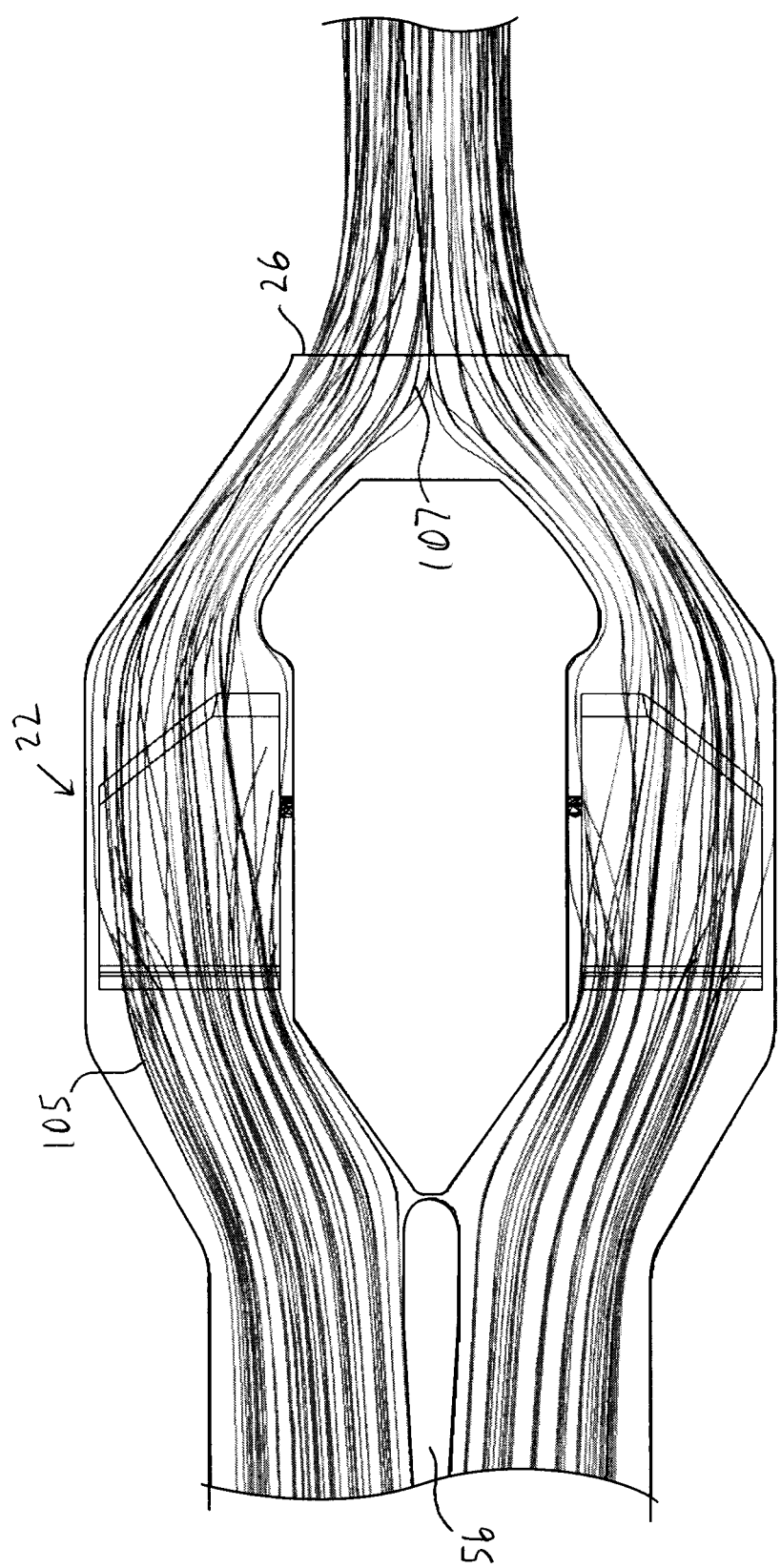
FIG. 4A is a cross-section of the housing of FIG. 3A providing a schematic illustration of the flow of the air through the housing when the air flow guide element is in its middle position, drawn at a larger scale.

The paths "$P_1$", "$P_2$" can be seen in FIG. 3G. It will be understood that the curved paths "$P_1$", "$P_2$" are schematically represented by center lines of the first and second channels 42, 48 respectively, for convenience. Those skilled in the art would appreciate that the air flow through the first and second channels 42, 48 generally follows the paths "$P_1$", "$P_2$" respectively when the air flow guide element 56 is in its middle position (FIGS. 3G, 4A). That is, when the air flow guide element 56 is in its middle position, the first channel air flow direction generally follows the first path "$P_1$", and the second channel air flow direction generally follows the second path "$P_2$". As will be described, the first channel and the second channel air flow directions differ, when the air flow guide element 56 is not in its middle position. The first and second channel air flow directions at the respective downstream ends 76, 78 when the air flow guide element 56 is in its middle position are generally schematically represented by arrows 84, 86 (FIGS. 3G, 3I).

In FIGS. 3B, 3D, 3E, and 3G, cross-carve vanes 88 are also shown. For clarity of illustration, the pair of cross-carve vanes are respectively identified by reference characters 88₁, 88₂ in FIGS. 3D and 3G. The cross-carve vanes 88₁, 88₂ are located in the central portions 80, 82 of the first and second channels 42, 48 respectively (FIG. 3G). As will be described, the pair of cross-carve vanes 88 are pivotable about an axis 90.

It will be understood that, in the positions illustrated in FIGS. 3B, 3E, and 3G, the cross-carve vanes 88 are illustrated in dashed outline for clarity of illustration. As illustrated, the cross-carve vanes would have minimal impact on the air flowing through the first and second channels, past the cross-carve vanes 88. This is because the cross-carve vanes 88, as illustrated in FIGS. 3B, 3E, and 3G, are generally aligned with the air flowing through the first and second channels 42, 48, i.e., they are shown as being generally aligned with the first channel and the second channel air flow directions respectively. It will also be understood that, when the cross-carve vanes 88 are pivoted to a different position, they direct the air flowing through the first and second channels 42, 48 at least partially transversely to the first channel and the second channel air flow directions, as will be described.

Figure 5A:
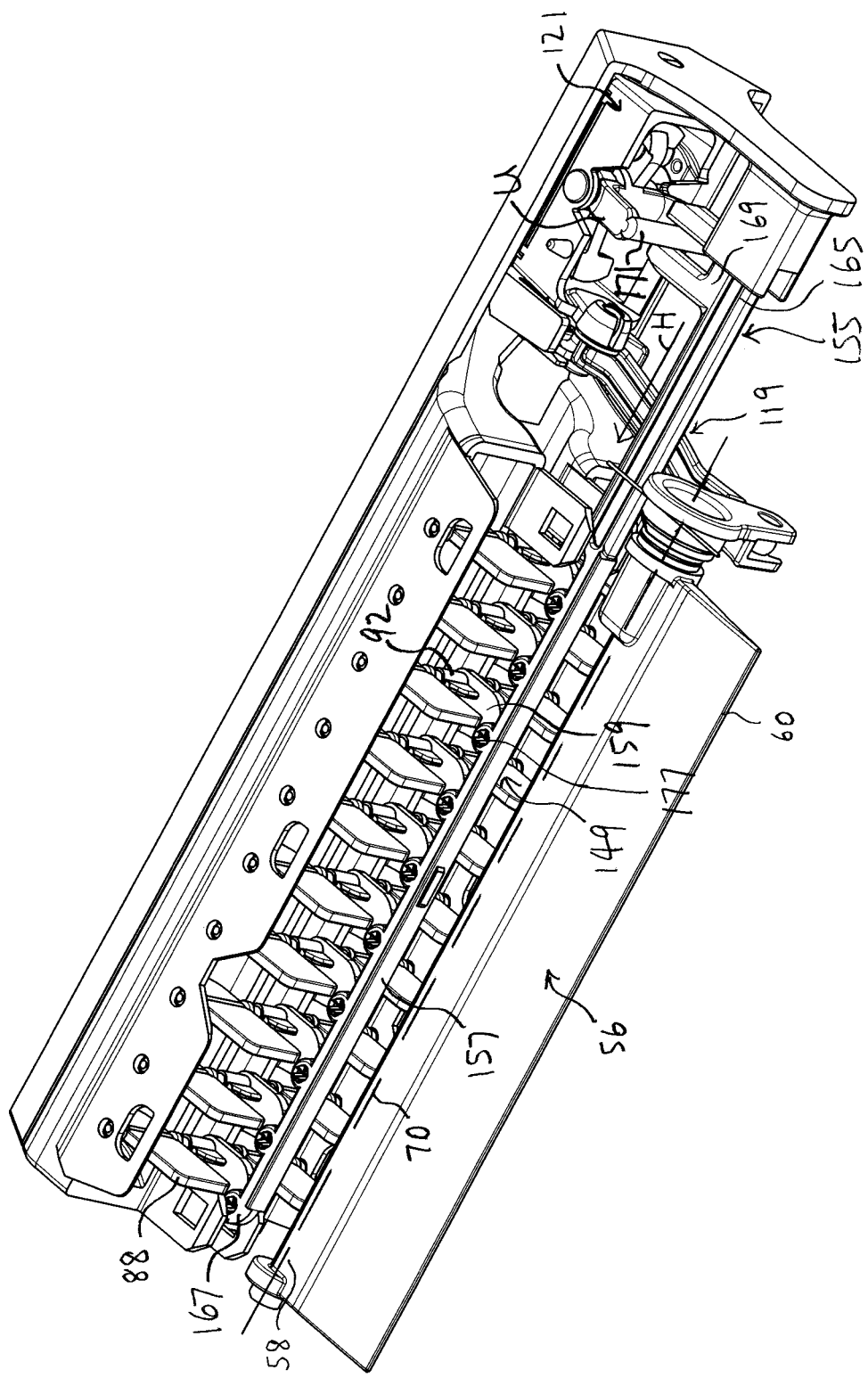
FIG. 5A is an isometric view of the back and a top side of the system of FIG. 1A, drawn at a smaller scale.
Figure 5B:
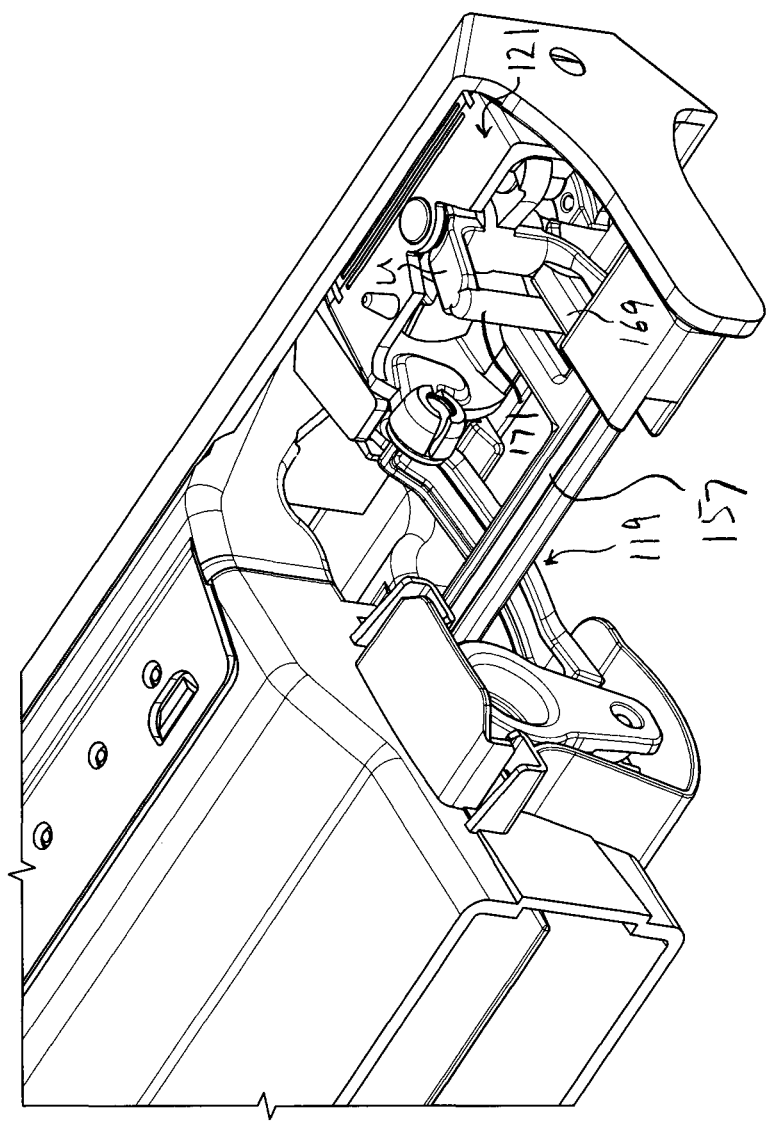
FIG. 5B is a portion of the system of FIG. 5A, drawn at a larger scale.
Figure 5C:
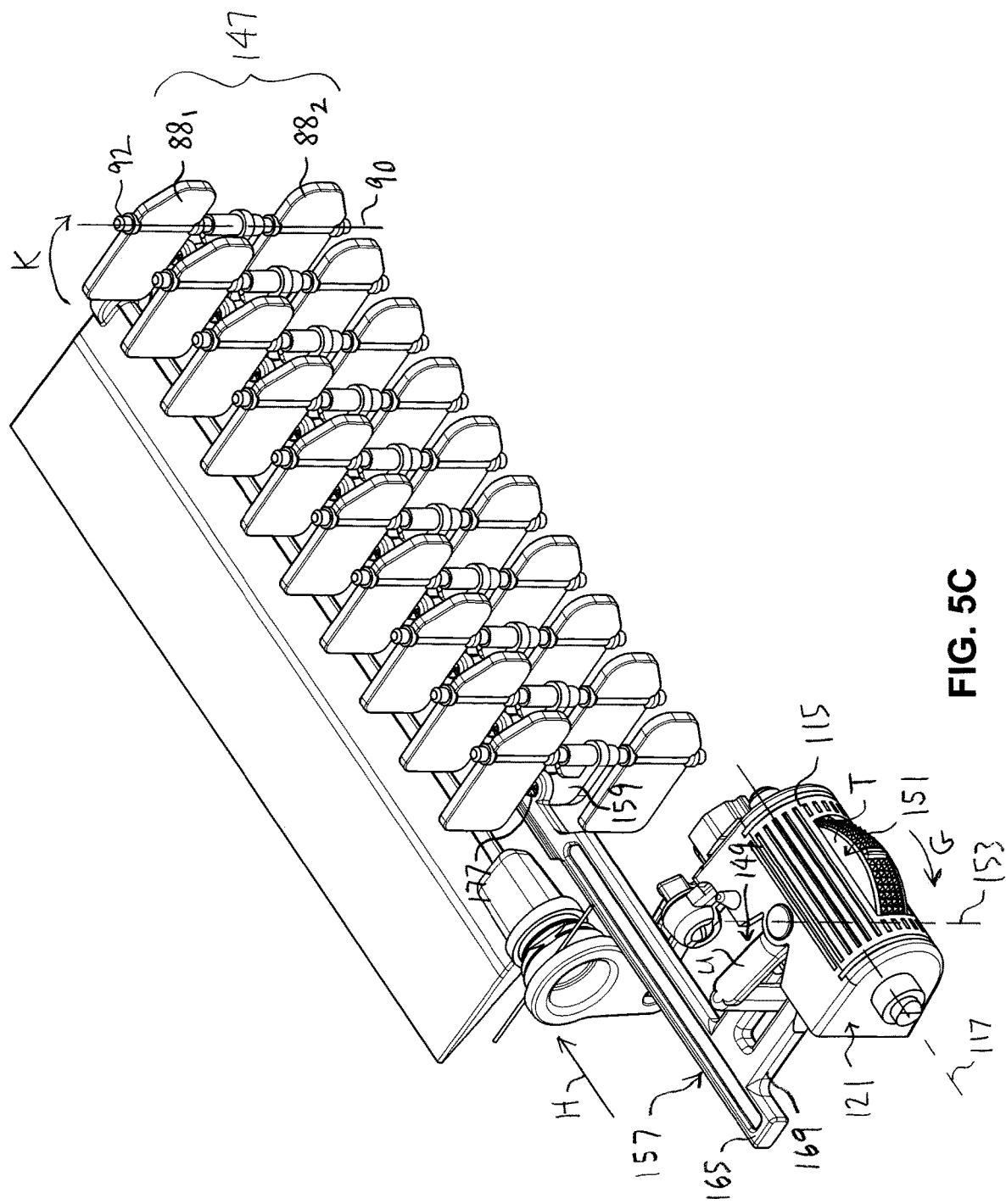
FIG. 5C is an isometric view of the front and top side of the system of FIGS. 5A and 5B, with certain elements omitted, drawn at a smaller scale.

As can also be seen in FIGS. 3D and 5C, the cross-carve vanes 88₁, 88₂ preferably are both secured to a cross-carve pin 92 defining the axis 90, so that the cross-carve vanes 88₁, 88₂ pivot together about the axis 90, when the pin 92 is rotated about its axis 90. As will also be described, the user may cause the cross-carve vanes 88 to pivot about the axis 90 to direct the air exiting the housing 22 partially transversely to the first channel and second channel air flow directions, as desired by the user.

Preferably, and as can be seen in FIG. 3G, first parts 94, 96 of the first and second central element surfaces 34, 36 diverge to partially define the upstream ends 72, 74 of the first and second channels 42, 48. It is also preferred that second parts 97, 98 of the first and second central element surfaces 34, 36 are located parallel to each other to partially define the central portions 80, 82 of the first and second channels 42, 48.

It is also preferred that the first and second central element surfaces 34, 36 includes outlet parts 101, 103 thereof that are formed to define narrower parts 42a, 48a of the first and second channels 42, 48 at their respective downstream ends 76, 78 that are narrower than the central portions 80, 82 thereof respectively (FIG. 3I).

As can be seen in FIG. 3I, the first internal surface 40 and the second internal surface 46 preferably include respective straight exit parts 40a, 46a that partially define the downstream ends 76, 78 of the first and second channels 42, 48. The exit parts 40a, 46a are not symmetrical relative to the central plane 28, so that air exiting the second channel 48 is directed toward the central plane 28 at a sharper angle than the air exiting the first channel 42. Accordingly, in one embodiment, the first and second internal surfaces 40, 46 are not symmetrical relative to the central plane 28.

In FIG. 3I, for clarity of illustration, a line 100 orthogonal to the central plane 28 partially defines the outlet end 26. Lines 100a, 100b, parallel to the central plane 28 and intersecting the exit parts 40a, 46a, are also provided for convenience. As can be seen in FIG. 3I, the exit part 40a defines an angle θ between the exit part 40a and the line 100a. The exit part 46a also defines an angle α between the exit part 46a and the line 100b. In one embodiment, e.g., when the first channel 42 is positioned above the second channel 48, as illustrated in FIG. 3I, the angle θ preferably is less than the angle α. For example, the angle θ may be 30°, and the angle α may be 35°. This arrangement causes the air exiting the second channel 48 to be directed more toward the central plane 28 than the air exiting the first channel 42. Accordingly, due to the asymmetry of the first and second channels 42, 48, the air exiting the second channel 48 is directed slightly more upwardly than the air that exits the first channel 42 is directly downwardly.

As can also be seen in FIG. 3I, the outlet parts 101, 103 preferably include respective extensions 101a, 103a at which the first and second channels 42, 48 are narrowed, due to the extensions 101*a*, 103*a*. For clarity of illustration, the parts of the first and second channels 42, 48 that are narrower than the balance of the channels 42, 48 are identified in FIG. 3I by the reference characters 42*a*, 48*a*. In particular, the narrower parts 42*a*, 48*a* are narrower than the central portions 80, 82, which are upstream and adjacent to the narrower parts 42*a*, 48*a*. Those skilled in the art would appreciate that the flow of the air in the first channel and the second channel air flow directions through the narrower parts 42*a*, 48*a* is accelerated relative to the flow of the air upstream from the parts 42*a*, 48*a*.

Because the extensions 101*a*, 103*a* partially define the parts 42*a*, 48*a* immediately upstream from the downstream ends 76, 78 of the first and second channels 42, 48, the extensions 101*a*, 103*a* have the beneficial effect of accelerating the air flowing through the first and second channels 42, 48 shortly before it exits therefrom, at the downstream ends 76, 78.

The air flowing through the narrower part 42*a* is believed to be accelerated in the direction indicated by arrow 183 in FIG. 3I. Similarly, the air flowing through the narrower part 48*a* is believed to be accelerated in the direction indicated by arrow 185 in FIG. 3I. It is also believed that the result is that the air flowing through the narrower parts 42*a*, 48*a* is accelerated, in the directions indicated by the arrows 183, 185, against the exit parts 40*a*, 46*a*, so that the air exiting the first and second channels 42, 48 is generally directed in the directions indicated by the arrows 84, 86 respectively.

As noted above, the exit parts 40*a*, 46*a* preferably are not symmetrical relative to the central plane 28. In particular, the second channel 48 is partly defined, at its downstream end 78, by the exit part 46*a*, which is more sharply angled toward the central plane 28 than is the corresponding exit part 40*a* that partially defines the downstream end 76 of the first channel 42.

Figure 4B:
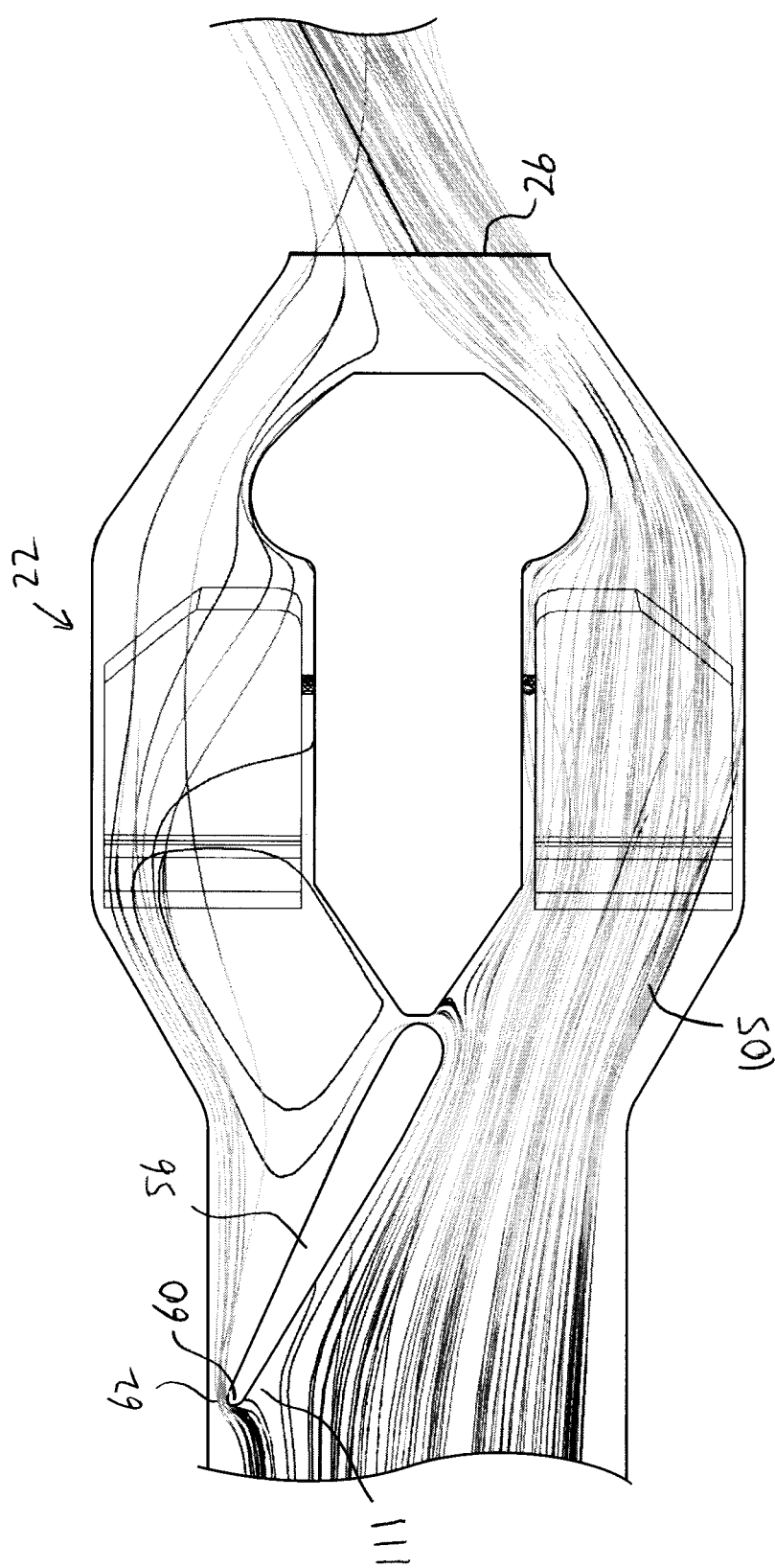
FIG. 4B is another cross-section of the housing of FIG. 3A providing a schematic illustration of the flow of the air through the housing when the air flow guide element is in its second position.
Figure 4C:
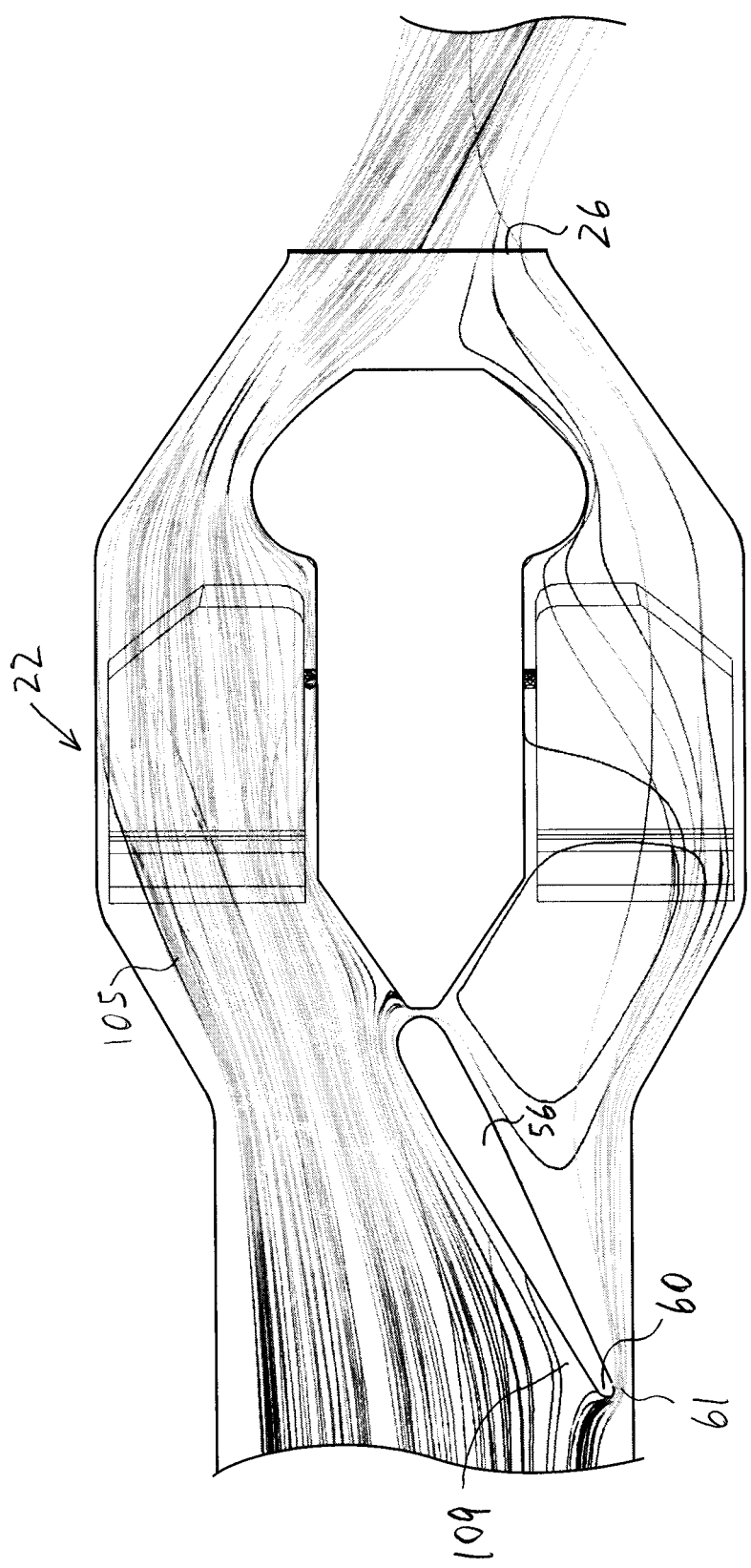
FIG. 4C is another cross-section of the housing of FIG. 3A providing a schematic illustration of the flow of the air through the housing when the air flow guide element is in its first position.

FIGS. 4A-4C are illustrations showing the results of computational fluid dynamics (CFD) analyses of the flow of the air through the housing 22 with the air flow guide element 56 in the middle position, in the second position, and in the first position respectively. The lines 105 schematically represent the trajectories of the air flow through the first and second channels 42, 48. As can be seen in FIG. 4A, when the air flow guide element 56 is in the middle position, a substantial portion of the volumes of the air flowing through the first and second channels 42, 48 is mixed together prior to exiting the housing 22, at a location generally identified by reference numeral 107 in FIG. 4A.

In FIG. 4B, although the second major portion of the volume of air flowing into the inlet portion 50 is directed into the second channel 48 by the air flow guide element 56 in its second position, the second minor portion of the volume of air coming into the inlet end 24 is also permitted to flow through the second gap 62, i.e., between the tip 60 and the inlet portion wall 54. Similarly, it can be seen in FIG. 4C that, when the air flow guide element 56 is in the first position thereof, the first major portion of the air flow is directed thereby into the first channel, but the first minor portion of the volume of air is also permitted to flow through the first gap 61, i.e., between the tip 60 and the inlet portion wall 54.

Based on FIGS. 4B and 4C, those skilled in the art would appreciate that the air pressure increases in the inlet portion 50 in the region that is immediately upstream from the air flow guide element 56, when the air flow guide element 56 is in either its first or its second position. The region in the inlet portion 50 where such pressure increase occurs when the air flow guide element 56 is in the first position is generally identified for convenience by reference numeral 109 in FIG. 4C. The region in the inlet portion 50 where such pressure increase occurs when the air flow guide element 56 is in the second position is generally identified for convenience by reference numeral 111 in FIG. 4B.

When the air flow guide element 56 is in its first position, the pressure increase in the region 109 tends to resist movement of the air flow guide element 56 away from the first position, i.e., the increased air pressure tends to resist the movement of the air flow guide element 56 in the direction opposite to the direction indicated by arrow "B" in FIG. 3B. Similarly, when the air flow guide element 56 is in its second position, the air pressure increase in the region 111 tends to resist movement of the air flow guide element in the direction opposite to the direction indicated by arrow "C" in FIG. 3E.

Those skilled in the art would appreciate that, if the air flow guide element 56 were allowed to move past the first position so that its tip engaged the inlet portion wall 54, the air pressure increase upstream from the air flow guide element 56 would be significant, to the extent that the user may have difficulty moving the air flow guide element away from that position. Similarly, if the air flow guide element 56 were allowed to move past the second position so that its tip engaged the inlet portion wall 54, the air flow guide element 56 would be subjected to significant air pressure holding it in that position.

It is believed that allowing the tip 60 of the air flow guide 56 to engage the inlet wall portion 54, i.e., so as to direct all of the volume of air entering the inlet portion 50 into either the first channel or the second channel, would result in increases in air pressure against the air flow guide element when the tip 60 engages the inlet portion wall 54 that would be so significant as to impede the user attempting to move the air flow guide element away from that location.

In contrast, in the ventilation system 20, because of the first gap 61 when the air flow guide element 56 is in its first position, the air pressure increase in the region 109 is minimized. This has the benefit of mitigating resistance to movement of the air flow guide element 56 away from the first position. Those skilled in the art would also appreciate that, in contrast, if the tip 60 of the air flow guide element 56 engaged the inlet wall 54 when the air flow guide element 56 is in the first position, the air pressure resistance to movement of the air flow guide element 56 away from its first position would be substantially greater.

Those skilled in the art would also appreciate that the second gap 62 that is formed when the air flow guide element 56 is in its second position similarly has the benefit that it causes the air pressure increase in the region 111 to be minimized. This also has the advantage of mitigating resistance to movement of the air flow guide element 56 away from the second position. Those skilled in the art would appreciate that, in contrast, if the tip 60 of the air flow guide element 56 engaged the inlet wall 54 when the air flow guide element 56 is in the second position, the air pressure resistance to movement of the air flow guide element 56 away from its second position would be substantially greater.

As noted above, the first gap 61 defines the first minimum distance "$D_1$" between the tip 60 and the inlet portion wall 54, when the air flow guide element 56 is in its first position. The second gap 62 defines the second minimum distance "$D_2$" between the tip 60 and the inlet portion wall 54, when the air flow guide element 56 is in its second position.

From the foregoing, and from FIGS. 4B and 4C, it can be seen that the first and second gaps 61, 62 resulting from the positions of the tip 60 of the air flow guide element being located spaced apart from the inlet portion wall 54 provide a significant functional benefit, because they enable the user to easily move the air flow guide element 56 from its first position or from its second position.

Those skilled in the art would also appreciate that the first and second minimum distances "$D_1$", "$D_2$" preferably are selected so as to permit the greatest major portion that is feasible to pass through the one of the first and second channels through which the major portion is directed. That is, because the user wishes to have most of the air flow through one of the first and second channels, it is desirable to minimize the amount of air that is allow through the first gap 61 and the second gap 62, as the case may be. Preferably, the major portion of the air (directed into either the first or the second channel) is maximized, and the minor portion of the air (directed through either the first gap 61 or the second gap 62) is minimized.

However, as noted above, the first gap 61 and the second gap 62 preferably are sufficiently large to permit enough air through that the pressure increases in the regions 109, 111 are limited, so that the user's movement of the air flow guide element 56 away from the first position or the second position thereof is not impeded, or at least not substantially impeded, by such pressure increases. It is preferred that the first minimum distance "$D_1$" is the minimum distance that the tip 60 may be spaced apart from the inlet wall portion 54 when the air flow guide element 56 directs the major portion of the air flow into the first channel 42 to achieve an acceptable (i.e., minimal) increase in air pressure in the region 109.

Similarly, the second minimum distance "$D_2$" is the minimum distance that the tip 60 may be spaced apart from the inlet wall portion 54 when the air flow guide element 56 directs the major portion of the air flow into the second channel 48 to achieve an acceptable increase in air pressure in the region 111. It is believed that, in the optimal design, the first minimum distance "$D_1$" is defined by the first gap 61, and the second minimum distance "$D_2$" is defined by the second gap 62.

As noted above, it is preferred that the user is able to move the air flow guide element 56 between the first and second positions, according to the user's preferences. In one embodiment, the ventilation system 20 preferably includes a first control element assembly 113 (FIG. 3D), which enables the user to move the air flow guide element 56. Preferably, and as can be seen in FIG. 5C and FIGS. 3C, 3D, 3F, and 3H, the first control element assembly 113 includes a first control element body 115 that is rotatable about a first control element axis 117 (FIGS. 3A, 5C) defined by the first control element body 115.

It is also preferred that the ventilation system 20 includes a first control linkage assembly 119 (FIGS. 3D, 5A, 5B) connecting the first control element body 115 and the air flow guide element 56, for transmitting rotational movement of the first control element body 115 about the first control element axis 117 into corresponding rotational movement of the air flow guide element 56 about the air flow guide element axis 70.

As can be seen in FIG. 3D, in one embodiment, the first control element assembly 113 preferably includes a first control element shell 121, in which the first control element body 115 is rotatable about the first control element axis 117. The first control element body 115 is rotatable in the first control element shell 121 about the axis 117 in the directions indicated by arrows "$A_1$", "$A_2$" in FIG. 3D.

It is also preferred that the first control element assembly 113 includes a first control element connector 123 (FIG. 3D), for connecting the first control element body 115 and the first control linkage assembly 119. As indicated in FIG. 3D, the first control element connector 123 preferably is formed to rotated with the first control element body 115 about the first control element axis 117. In one embodiment, the connector 123 preferably is integrally formed with the first control element body 115. Accordingly, rotation of the first control element body 115 about the first control element axis 117 causes simultaneous corresponding rotation of the first control element connector 123 about the first control element axis 117.

As can also be seen in FIG. 3D, the first control element assembly 113 preferably includes first and second stop elements 125, 127 that are formed to engage the first control element shell 121 to stop rotation of the first control element body 115 about the first control element axis 117, when the air flow guide element 56 is in the first position and the second position thereof respectively.

In one embodiment, and as can be seen in FIGS. 3C, 3D, 3F, and 3H, the first and second stop elements 125, 127 preferably are mounted on the first control element body 115.

It will be understood that, as illustrated in FIG. 3D, the first control element body 115 is prevented from further rotation in the direction indicated by arrow "$A_1$" by the engagement of the first stop element 125 with an inner surface 129 of the first control element shell 121. As can also be seen in FIG. 3D, when the first control element body 115 is in this position, the air flow guide element 56 is in its first position.

It will be understood that the position of the first control element body 115 as illustrated in FIG. 3C is the same position as that shown in FIG. 3D, i.e., the position in which rotation of the first control element body 115 further in the direction indicated by arrow "$A_1$" is prevented by engagement of the first stop element 125 with the first control element shell 121. It can therefore be seen that the position of the first control element body 115 as illustrated in FIG. 3C corresponds to the positioning of the air flow guide element 56 as illustrated in FIG. 3B, i.e., the first position of the air flow guide element 56.

As described above, when the air flow guide element 56 is in its first position, the tip 60 of the air flow guide element 56 preferably is spaced apart from the inlet portion wall 54 by the first minimum distance "$D_1$". As noted above, the first minimum distance "$D_1$" provides the first gap 61, which allows sufficient air flow between the tip 60 and the inlet portion wall 54 that the air pressure in the region 109 will be such that the user may easily move the air flow guide element 56 from the first position thereof.

Figure 3H:
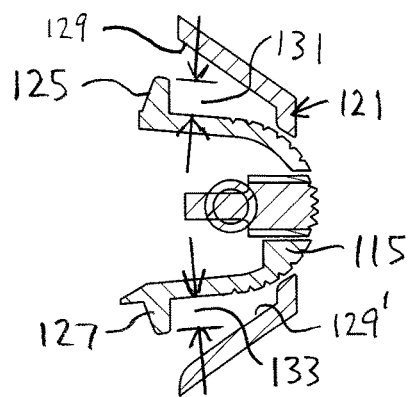
FIG. 3H is a cross-section taken along section B-B in FIG. 3A, in which the first control element body including the stop element is in a middle position thereof, corresponding to the middle position of the air flow guide element in FIG. 3G.

As can be seen in FIG. 3H, the first stop element 125 extends a preselected length 131 from the first control element body 115. The preselected length 131 is selected so that, when the first stop element 125 engages the inner surface 129 (as shown in FIGS. 3C and 3D), rotation of the first control element body 115 in the direction indicated by arrow "$A_1$" is stopped at the point where the tip 60 of the air flow guide element 56 is spaced apart from the inlet portion wall 54 by the first minimum distance "$D_1$", i.e., when the air flow guide element 56 is in its first position.

For example, in FIG. 3B, arrow "B" indicates the direction in which the air flow guide element 56 pivots about its axis 70, in order to reach the first position thereof. This movement is effected by the user, by rotating the first control element body 115 about its axis 117 in the direction indicated by arrow "$A_1$". Rotation of the first control element body 115 about its axis 117 causes corresponding rotation of the air flow guide element 56 about its axis 70, due to the connection therebetween provided by the first control linkage assembly 119, as will be described.

Rotation of the first control element body 115 in the direction indicated by arrow "$A_1$" stops when the first stop element 125 engages the inner surface 129 (FIGS. 3C, 3D). The preselected length 131 of the first stop element 125 prevents the first control body 115 from rotating beyond the point at which it locates the tip 60 at the first minimum distance "$D_1$" from the inlet portion wall 54, to define the gap 61. Accordingly, if the preselected length 131 is larger, the first gap 61 between the tip 60 and the inlet portion wall 54 would be correspondingly larger. Similarly, a smaller preselected length 131 of the first stop element 125 would result in a correspondingly smaller first gap 61.

As noted above, when the air flow guide element 56 is in its second position, the tip 60 of the air flow guide element 56 preferably is spaced apart from the inlet portion wall 54 by the second minimum distance "$D_2$". The second stop element 127 preferably extends a preselected length 133 from the first control element body 115.

It will be understood that the preselected length 133 of the second stop element 127 is also selected so that when the second stop element 127 engages the inner surface 129 (as shown in FIG. 3F), rotation of the first control element body 115 in the direction indicated by arrow "$A_2$" is stopped at the point where the tip 60 of the air flow guide element 56 is spaced apart from the inlet portion wall 54 by the second minimum distance "$D_2$", i.e., when the air flow guide element 56 is in its second position.

As described above, the second minimum distance "$D_2$" is the minimum distance defining the second gap 62 that will enable sufficient air to pass through the gap and result in a decreased pressure in the region 111, so as to enable the user to easily move the air flow guide element 56 from its second position (i.e., in the direction opposite to the direction indicated by arrow "C"). Accordingly, if the preselected length 133 were longer, the gap 62 would be correspondingly larger, and if the preselected length 133 were instead shorter, the gap 62 would be correspondingly smaller.

In one embodiment, the first control linkage assembly 119 preferably includes a first linkage arm 135 extending between a first end 137 and a second end 139 thereof, and an air flow guide element connector 141, extending between a first end 143 and a second end 145 thereof (FIG. 3D).

As can be seen in FIG. 3D, the first linkage arm 135 preferably is pivotably connected with the first control element connector 123 at the first end 137 by a first pivot pin "$E_1$", and the first linkage arm 135 preferably is pivotably connected at the second end 139 thereof with the first end 143 of the air flow guide element connector 141, by a second pivot pin "$E_2$". At its second end 145, the air flow guide element connector 141 is secured to the base portion 58 of the air flow guide element 56.

From the foregoing, it can be seen that rotation of the first control element body 115 in the direction indicated by arrow "$A_1$" moves the pivot pin "$E_1$" generally upwardly, as indicated by arrow "$F_1$" in FIG. 3D, and this pulls the first linkage arm 135 upwardly also. Upward movement of the first linkage arm 135 pulls the first end 143 in the direction indicated by arrow "$F_2$" in FIG. 3D, causing the air flow guide element 56 to pivot about its axis 70 (not shown in FIG. 3D), in the direction indicated by arrow "B" in FIGS. 3B and 3D.

In order to move the air flow guide element 56 from the first position toward the second position thereof, the user rotates the first control element body 115 in the direction indicated by arrow "$A_2$". Due to such rotation, the first stop element 125 disengages from the inner surface 129 of the first control element shell 121, and the pivot pin "E" is moved in the direction indicated by arrow "$A_2$". This motion of the pivot pin "$E_1$" causes the first linkage arm 135 to move generally in a direction opposite to the direction indicated by arrow "$F_1$", which in turn causes the first end 143 of the air flow guide element connector 141 to move in a direction opposite to the direction indicated by arrow "$F_2$". Such movement causes the air flow guide element connector 141 to pivot about the axis 70 of the air flow guide element 56, and the air flow guide element 56, to which the air flow guide element connector 141 is secured, pivots in the direction indicated by arrow "C" in FIGS. 3D and 3E.

Those skilled in the art would appreciate that the first control element body 115 may be pivoted about the first control element axis 117 in the direction indicated by arrow "$A_2$" until the second stop element 127 engages the inner surface 129' of the first control element shell 121, as indicated in FIG. 3F. From the foregoing, it can be seen that such rotation of the first control element body 115 brings the air flow guide element 56 to its second position (FIG. 3E).

Those skilled in the art would also appreciate that, as noted above, the user may position the air flow guide element 56 at any intermediate position between the first and second positions, by rotating the first control element body 115 as needed to do so. As can be seen in FIGS. 3G and 3H, in order to position the air flow guide element 56 in its middle position (i.e., equidistant between the first and second positions), the first control element body 115 preferably is located in a middle position, in which the first and second stop elements 125, 127 are both spaced apart from the inner surfaces 129, 129' by the same distance.

From the foregoing, it can be seen that, if the air flow guide element 56 is in the first position and the user wishes to move the air flow guide element 56 from the first position to another position (intermediate or otherwise), the user rotates the first control element body 115 about its axis 117 in the direction indicated by arrow "$A_2$" in FIG. 3D, to position the air flow guide element 56 as desired. Similarly, if the air flow guide element 56 is in the second position, to move the air flow guide element 56 to another position (intermediate or otherwise), the user rotates the first control element body 115 about its axis 117 in the direction indicated by arrow "$A_1$", to position the air flow guide element 56 as desired. Preferably, the first control element body 115 is positioned so that it is accessible by the user, as can be seen in FIGS. 1-3A.

In one embodiment, the ventilation system 20 preferably also includes a number of the cross-carve vanes 88. Preferably, the cross-carve vanes 88 are arranged in pairs 147, and each cross-carve vane 88 in a pair 147 is secured to the cross-carve pin 92 that defines the axis 90 about which that pair 147 of cross-carve vanes 88 is pivotable. In one embodiment, and as illustrated in FIGS. 3B, 3E, and 3G, it is preferred that in each pair 147, one of the cross-carve vanes 88 is positioned in the first channel 42, and the other of the cross-carve vanes 88 is positioned in the second channel 48. For example, in FIGS. 3D, 3G, and 5C, pairs 147 of the cross-carve vanes $88_1$, $88_2$ are shown, and they are shown in FIG. 3G as being positioned in the first and second channels 42, 48 respectively.

As can be seen in FIGS. 5A and 5C, it is preferred that a number of the pairs 147 of the cross-carve vanes 88 are spaced apart from each other and located across the width "W" of the housing 22 (FIG. 5A), the width "W" being transverse to the initial air flow direction.

Preferably, the cross-carve vanes 88 are positionable to at least partially direct the air flow through the first channel 42 in a first direction at least partially transverse to the first channel air flow direction, and to at least partially direct the air flow through the second channel 48 in a second direction at least partially transverse to the second channel air flow direction. As illustrated, the user is able to use the cross-carve vanes 88 to direct the air generally to one side or another (e.g., left, or right) or any intermediate direction as it exits the outlet end 26.

As can be seen in FIGS. 5A-5C, the ventilation system 20 preferably also includes a second control element assembly 149 for controlling the cross-carve vanes 88. It is preferred that the second control element assembly 149 includes a second control element body 151 that is pivotable about a second control element axis 153 (FIG. 5C).

The second control element body 151 preferably is operatively connected with the pairs 147 of cross-carve vanes 88 by a second control linkage assembly 155, wherein rotation of the second control element body 151 about the second control element axis 153 causes corresponding movement of each of the pairs 149 of the cross-carve vanes 88 about the respective axes 90 thereof.

In one embodiment, the second control linkage assembly 155 preferably includes an elongate arm 157 pivotably connected to each said pin 92 by respective connecting elements 159, for uniform movement of the pairs 147 of the cross-carve vanes 88 in response to movement of the elongate arm 157. As can be seen in FIG. 5A, the elongate arm 157 preferably extends between first and second ends 165, 167.

It is also preferred that the second control linkage assembly 155 additionally includes a second connector element 169 connecting the second control element body 151 and the first end 165 of the elongate arm 157.

In one embodiment, the second control element body 151 preferably is positioned in the first control element body 115. It is also preferred that the second control element body 151 is rotatable with the first control element body 115 about the first control element axis 117.

As can be seen in FIG. 5A, the second control element body 151 preferably includes an inner end part 171 formed to fit between and slidably engage arms 173, 175 of the second connector 169 (FIG. 3A), so that the inner end part 171 remains located between and engaged with the arms 173, 175 as the second control element body 151 is rotated with the first control element body 115, about the first control element axis 117.

As can be seen in FIGS. 3A and 5A, the second control element 151 preferably includes a thumbwheel "T" and an internal element "U" to which the thumbwheel "T" is secured. Preferably, the inner end part 171 is also secured to the internal element "U".

Preferably, the second control element axis 153 is positioned orthogonal to the first control element axis 117 (FIG. 5C).

From the foregoing, it can be seen that the second control element assembly 149 enables the user to cause the cross-carve vanes 88 to pivot about their respective axes 90, to direct the air exiting from first and second channels 42, 48 in directions at least partially transverse to the first channel air flow direction and the second channel air flow direction respectively. For example, movement of the second control element body 151 in the direction indicated by arrow "G" in FIG. 5C causes corresponding movement of the second connector 169 in the direction indicated by arrow "H" in FIG. 5C. Because the second connector 169 is secured to the first end 165 of the elongate arm 157, the movement of the second connector 169 also causes corresponding movement of the elongate arm 157 in the direction indicated by arrow "H" in FIG. 5A.

As can be seen in FIGS. 5A and 5C, each of the connecting elements 159 is pivotably connected to the elongate arm 157 by a pin 177, about which the connecting element 159 is pivotable. Each of the connecting elements 159 is also connected with one of the cross-carve pins 92. Accordingly, movement of the elongate arm 157 in the direction indicated by arrow "H" in FIG. 5C causes each of the pairs 147 of the cross-carve vanes 88 to pivot as indicated by arrow "K" in FIG. 5C. Similarly, movement of the second control element body 151 in a direction opposite to the direction indicated by arrow "G" causes movement of the elongate arm 157 in a direction opposite to the direction indicated by arrow "H", and results in pivoting movement of the cross-carve vanes 88 in a direction opposite to the direction indicated by arrow "K".

Those skilled in the art would appreciate that the cross-carve vanes are generally more effective when located at the exit from a channel through which air is directed. However, those skilled in the art would also appreciate that, in general, it is preferred that the cross-carve vanes are not easily observable by the user.

As can be seen, e.g., in FIGS. 3B, 3E, and 3G, in the ventilation system 20, the cross-carve vanes 88 preferably are located in the central portions 80, 82 of the first and second channels 42, 48. Preferably, the cross-carve vanes 88 are located a predetermined distance 181 upstream relative to the first channel air flow direction and the second channel air flow direction from the outlet 26 of the housing, so that the cross-carve vanes 88 are at least partially concealed by the housing 22. In one embodiment, the cross-carve vanes 88 preferably are located proximal to the respective second parts 97, 98 of the first central element surface 34 and the second central element surface 36. It can be seen in FIG. 2A that the cross-carve vanes 88 are at least partially concealed by the housing 22 due to the location of the cross-carve vanes 88 adjacent to the respective second parts 97, 98 of the first central element surface 34 and the second central element surface 36. The position of the cross-carve vanes 88 in the central portions 80, 82 of the first and second channels 42, 48 is advantageous, as it is desirable that the cross-carve vanes 88 be at least partially concealed from the user.

As noted above, the first and second channels 42, 48 preferably include respective narrower parts 42*a*, 48*a*, partially defined by the respective extensions 101*a*, 103*a* of the outer parts 101, 103 (FIG. 3I). The narrower parts 42*a*, 48*a* are located downstream from the cross-carve vanes 88, which are located in the central portions 80, 82 of the first and second channels respectively (FIG. 3G). As can be seen in FIG. 2A, due to the extensions 101*a*, 103*a*, the cross-carve vanes 88 are concealed from the user.

As can be seen in FIG. 3I, the housing 22 preferably includes an outlet portion 183 positioned between the respective downstream ends 76, 78 of the first and second channels 42, 48 and the outlet end 26 of the housing. It is preferred that the first and second channels 42, 48 are formed to at least partially mix the air flowing therethrough together in the outlet portion 183, prior to the air flowing through the first and second channels 42, 48 exiting the housing 22.

It will also be understood that the outlet portion 183 is also partially defined by first and second end walls 189, 191 (FIG. 3A). As can be seen in FIG. 3A, the center of the housing 22 is generally located along line A-A.

When the cross-carve vanes 88 (not shown in FIG. 3A) are pivoted to direct air flow generally toward the first end wall 189, as indicated by arrow 193, the air flowing past the first end wall 189 tends to adhere to the first end wall 189 (i.e., due to the Coanda effect), causing the air flow to be directed somewhat further to the left, as viewed in FIG. 3A. When the cross-carve vanes 88 are pivoted to direct air flow generally toward the second end wall 191, as indicated by arrow 195, the air flowing past the second end wall 191 tends to adhere to the second end wall 191, causing the air flow to be directed somewhat further to the right, as viewed in FIG. 3A. As can be seen in FIG. 3A, the first end wall 189 is formed to be curved outwardly, i.e., away from the line A-A.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A ventilation system comprising:
    a housing extending between an inlet end, into which a volume of air is directed in an initial air flow direction, and an outlet end, at which the volume of air exits the housing, the inlet end and the outlet end defining a central plane of the housing;
    the housing comprising:
        a central element having first and second central element surfaces;
        a first outer element having a first internal surface spaced apart from the first central element surface to define a first channel therebetween;
        a second outer element having a second internal surface spaced apart from the second central element surface to define a second channel therebetween;
        an inlet portion located between the inlet end and the first and second channels, the inlet portion comprising an inlet channel defined by at least one inlet portion wall; and
    an air flow guide element extending between a base portion and a tip thereof, the air flow guide being pivotable about an air flow guide element axis through the base portion, the air flow guide element being movable between a first position, in which the tip is located at a predetermined first minimum distance from said at least one inlet portion wall and the air flow guide element directs a first major portion of the volume of air flowing into the inlet end in the initial direction into the first channel, and a second position, in which the tip of the air flow guide is located at a predetermined second minimum distance from said at least one inlet portion wall and the air flow guide element directs a second major portion of the volume of air flowing into the inlet end in the initial direction into the second channel, the predetermined first minimum distance being sufficient to limit pressure exerted by the volume of air flowing into the inlet portion against the air flow guide element to enable movement thereof from the first position, and the predetermined second minimum distance being sufficient to limit the pressure exerted by the volume of air flowing into the inlet portion against the air flow guide element to enable movement thereof;
    a first control element assembly comprising a first control element body rotatable about a first control element axis defined by the first control element body;
    a first control linkage assembly connecting the first control element body and the air flow guide element, for transmitting rotational movement of the first control element body about the first control element axis into corresponding rotational movement of the air flow guide element about the air flow guide element axis;
    the first control element assembly additionally comprising:
        a first control element shell, in which the first control element body is rotatable about the first control element axis;
        a first control element connector, for connecting the first control element body and the first control linkage assembly, the first control element connector being formed to rotate with the first control element body about the first control element axis; and
        first and second stop elements formed to engage the first control element shell to stop rotation of the first control element body about the first control element axis, the first stop element being formed to stop the air flow guide element pivoting at the first position when the tip is spaced apart from said at least one inlet portion wall by the predetermined first minimum distance, and the second stop element being formed to stop the air flow guide element pivoting at the second position when the tip is spaced apart from said at least one inlet portion wall by the predetermined second minimum distance.

2. A ventilation system according to claim 1 in which:
    the air directed into the first channel moves through the first channel in a first channel air flow direction and the air directed into the second channel moves through the second channel in a second channel air flow direction;
    the first and second channels extend between respective upstream ends thereof and respective downstream ends thereof relative to the first channel air flow direction and the second channel air flow direction respectively, each of the upstream ends and the downstream ends being located proximal to the central plane of the housing;
    each of the first and second channels comprises a central portion thereof respectively, located between the upstream and downstream ends of each of the first and second channels; and
    the central portion of each of the first and second channels is spaced apart from the central plane of the housing, wherein the first and second channels define respective paths therein along which the air flows therethrough in respective first channel and second channel air flow directions toward the downstream ends.

3. A ventilation system according to claim 2 in which respective first parts of the first and second central element together diverge from the inlet end toward the outlet end to partially define the upstream ends of the first and second channels.

4. A ventilation system according to claim 3 in which the first and second internal surfaces comprise respective first and second straight exit parts that at least partially define respective downstream ends of the first and second channels, the second exit part defining a second angle relative to the central plane that is smaller than a first angle relative to the central plane defined by the first exit part, wherein the air exiting the second channel is directed more toward the central plane than the air exiting the first channel.

5. A ventilation system according to claim 1 in which the first control linkage assembly comprises:
- a first linkage arm extending between a first end and a second end thereof;
- an air flow guide element connector extending between a first end and a second end thereof;
- the first linkage arm being pivotably connected at the first end thereof with the first control element connector by a first pivot pin;
- the first linkage arm also being pivotably connected at the second end thereof with the air flow guide element connector at the first end thereof by a second pivot pin; and
- the air flow guide element connector being secured at the second end thereof to the base portion of the air flow guide element.

6. A ventilation system according to claim 5 additionally comprising:
- a plurality of cross-carve vanes arranged in pairs, each said pair of cross-carve vanes being secured to a cross-carve vane pin defining an axis about which said pair of cross-carve vanes is pivotable;
- said pairs of said plurality of cross-carve vanes mounted on respective cross-carve vane pins being spaced apart from each other and located across a width of the housing transverse to the initial air flow direction; and
- the plurality of cross-carve vanes being positionable to at least partially direct the air flow in the first channel in a first direction at least partially transverse to the first channel air flow direction, and to at least partially direct the air flow in the second channel in a direction at least partially transverse to the second channel air flow direction.

7. A ventilation system according to claim 6 additionally comprising:
- a second control element assembly comprising a second control element body pivotable about a second control element axis;
- a second control linkage assembly operatively connecting the second control element body with and the pairs of the plurality of cross-carve vanes, wherein rotation of the second control element body about the second control element axis causes corresponding rotation of each of the pairs of the plurality of cross-carve vanes about the respective axes thereof; and
- the second control element body being pivotably mounted in the first control element body and rotatable with the first control element body about the first control element axis.

8. A ventilation system according to claim 7 in which the second control linkage assembly comprises an elongate arm extending between first and second ends thereof and pivotably connected to each said cross-carve vane pin by respective connecting elements, for uniform movement of said pairs of the plurality of cross-carve vanes in response to movement of the elongate arm.

9. A ventilation system according to claim 8 in which the second control linkage assembly additionally comprises a second connector element connecting the second control element body and the first end of the elongate arm.

10. A ventilation system according to claim 9 in which the second control element body comprises an inner end part formed to slidably engage arms of the second connector element, wherein the inner end part remains between and engaged with the arms of the second connector element as the second control element body is rotated with the first control element body about the first control element axis.

11. A ventilation system according to claim 10 in which the plurality of cross-carve vanes are located in the central portions of the first and second channels.

12. A ventilation system according to claim 11 in which:
- the housing comprises an outlet portion positioned between (i) the downstream ends of the first and second channels, and (ii) the outlet end of the housing; and
- the first and second channels are formed to at least partially mix the air flowing therethrough together in the outlet portion, prior to the air exiting from the housing.

13. A method of guiding a volume of air directed into an inlet portion of a housing in an initial air flow direction, the inlet portion comprising at least one inlet portion wall defining an inlet channel, the method comprising:
- (a) providing a central element in the housing, the central element having first and second central element surfaces, the first and second central elements partially defining first and second channels downstream from said at least one inlet portion relative to the initial air flow direction;
- (b) providing an air flow guide element extending between a base portion and a tip thereof, the air flow guide element being rotatable about an air flow guide element axis, the air flow guide element being mounted to locate the tip in the inlet channel, the air flow guide being movable between:
  - (i) a first position, in which the tip is located at a predetermined first minimum distance from said at least one inlet portion wall, and
  - (ii) a second position, in which the tip is located at a predetermined second minimum distance from said at least one inlet portion wall;
- (c) rotating the air flow guide element to the first position, to direct thereby a first major portion of the volume of air into the first channel, and to allow a first minor portion of the volume of air through a first gap defined by the predetermined first minimum distance into the second channel, wherein the predetermined first minimum distance is sufficient to limit pressure exerted by the volume of air flowing into the inlet portion against the air flow guide element to enable movement of the air flow guide element from the first position toward the second position;
- (d) rotating the air flow guide element to the second position, to direct thereby a second major portion of the volume of air into the second channel, and to allow a second minor portion of the volume of air through a second gap defined by the predetermined second minimum distance into the first channel, wherein the predetermined second minimum distance is sufficient to limit the pressure exerted by the volume of air flowing into the inlet portion against the air flow guide element to enable movement of the air flow guide element from the second position toward the first position;
- (e) providing a first control element assembly for controlling movement of the air flow guide element, the first control element assembly comprising: a first control element body rotatable about a first control element axis defined by the first control element body;
- (f) additionally providing a first control linkage assembly connecting the first control element body and the air flow guide element, for transmitting rotational movement of the first control element body about the first control element axis into corresponding rotational movement of the air flow guide element about the air flow guide element axis;

(g) additionally providing, in the first control element assembly: a first control element shell, in which the first control element body is rotatable about the first control element axis; a first control element connector, for connecting the first control element body and the first control linkage assembly, the first control element connector being formed to rotate with the first control element body about the first control element axis; and first and second stop elements formed to engage the first control element shell to stop rotation of the first control element body about the first control element axis, when the air flow guide element is in the first and second positions thereof respectively, (h) rotating the first control element body about the first control element axis, to rotate the air flow guide element about the air flow guide element axis;

(i) with the first stop element, engaging the first control element shell, to stop rotation of the air flow guide element about the air flow guide element axis at the first position thereof when the tip is spaced apart from said at least one inlet portion wall by the predetermined first minimum distance; and (j) with the second stop element, engaging the first control element shell, to stop rotation of the air flow guide element about the air flow guide element axis at the second position thereof when the tip is spaced apart from said at least one inlet portion wall by the predetermined second minimum distance.

* * * * *

UNITED STATES PATENT AND TRADEMARK OFFICE
CERTIFICATE OF CORRECTION

| | |
|---|---|
| PATENT NO. | : 11,280,517 B1 |
| APPLICATION NO. | : 17/032881 |
| DATED | : March 22, 2022 |
| INVENTOR(S) | : Nikola Jovicic, Jason Fraser and Marian Ticu |

It is certified that error appears in the above-identified patent and that said Letters Patent is hereby corrected as shown below:

On the Title Page

Item (54), and In the Specification, Column 1, Lines 1-4, should read:
-- AIR VENT WITH ROTATING CONTROL ELEMENTS AND A CENTRAL ELEMENT DEFINING CHANNELS AND METHOD OF CONTROLLING AIR FLOW VIA SAME --

Signed and Sealed this
Twenty-fourth Day of May, 2022

Katherine Kelly Vidal
*Director of the United States Patent and Trademark Office*